United States Patent
Mueller et al.

(10) Patent No.: US 11,777,358 B2
(45) Date of Patent: Oct. 3, 2023

(54) INTERCONNECTION UNIT AND METHOD FOR PRODUCING A WINDING SYSTEM

(71) Applicants: Torsten Mueller, Gerhardshofen (DE); Harald Mueller, Gerhardshofen (DE)

(72) Inventors: Torsten Mueller, Gerhardshofen (DE); Harald Mueller, Gerhardshofen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 230 days.

(21) Appl. No.: 17/195,950

(22) Filed: Mar. 9, 2021

(65) Prior Publication Data

US 2021/0305872 A1 Sep. 30, 2021

(30) Foreign Application Priority Data

Mar. 26, 2020 (DE) .......................... 102020203944.5

(51) Int. Cl.
*H02K 3/52* (2006.01)
*H01R 31/00* (2006.01)
(Continued)

(52) U.S. Cl.
CPC .............. *H02K 3/522* (2013.01); *H01R 31/00* (2013.01); *H01R 31/02* (2013.01); *H02K 5/225* (2013.01);
(Continued)

(58) Field of Classification Search
CPC ............ H02K 3/28; H02K 3/50; H02K 3/522; H02K 2203/03; H02K 3/02; H02K 29/08; H02K 5/225
See application file for complete search history.

(56) References Cited

U.S. PATENT DOCUMENTS

| | | | | |
|---|---|---|---|---|
| 5,900,687 A | * | 5/1999 | Kondo | H02K 3/522 310/260 |
| 8,922,080 B2 | * | 12/2014 | Nakagawa | H01R 43/16 310/71 |

(Continued)

FOREIGN PATENT DOCUMENTS

| CN | 202759311 U | 2/2013 |
|---|---|---|
| DE | 102017206187 A1 | 10/2017 |

(Continued)

OTHER PUBLICATIONS

German Search Report for German Application No. 10 2020 203 944.5 dated Jan. 28, 2021.

*Primary Examiner* — Leda T Pham
(74) *Attorney, Agent, or Firm* — Lempia Summerfield Katz LLC

(57) ABSTRACT

The disclosure relates to an electrical machine for a drive system of an electrically driven aircraft and its winding system. In particular, the disclosure relates to an interconnection unit for interconnecting the windings of the winding system. For electrically connecting winding arrangements of the winding system, the interconnection unit has a connection arrangement with large number of contact points which are configured and arranged on the interconnection unit such that these contact points of the interconnection unit may be connected to contact points of the winding arrangements to be contact-connected. The connection arrangement furthermore has a large number of electrical connection sections, wherein a respective connection section connects two of the contact points to one another. This interconnection unit may be contact-connected by way of its contact points to corresponding contact points of the winding arrangements, so that a desired winding system may be constructed in a simple manner.

17 Claims, 5 Drawing Sheets

(51) Int. Cl.
  *H01R 31/02* (2006.01)
  *H02K 15/00* (2006.01)
  *H02K 5/22* (2006.01)
(52) U.S. Cl.
  CPC ..... *H02K 15/0062* (2013.01); *H01R 2201/10* (2013.01); *H02K 2203/09* (2013.01)

(56) References Cited

U.S. PATENT DOCUMENTS

| | | | | |
|---|---|---|---|---|
| 2002/0067094 A1* | 6/2002 | Okazaki | ................ | H02K 3/522 310/180 |
| 2009/0256439 A1* | 10/2009 | Inoue | .................... | H02K 3/522 310/71 |
| 2018/0262075 A1* | 9/2018 | Csoti | ...................... | H02K 5/225 |

FOREIGN PATENT DOCUMENTS

| | | |
|---|---|---|
| DE | 102016224526 A1 | 6/2018 |
| DE | 102017213883 A1 | 2/2019 |

* cited by examiner

INTERCONNECTION UNIT AND METHOD FOR PRODUCING A WINDING SYSTEM

The present patent document claims the benefit of German Patent Application No. 10 2020 203 944.5, filed Mar. 26, 2020, which is hereby incorporated by reference.

TECHNICAL FIELD

The disclosure relates to an electrical machine for a drive system of an electrically driven aircraft and, in particular, its winding system. In particular, the disclosure is targeted at an assistance device or system for interconnecting the windings of the winding system.

BACKGROUND

As alternatives to customary internal combustion engines, concepts based on electric drive systems are being investigated and used for mobile applications, for example for driving aircraft, such as airplanes or helicopters, or else for electrically driven land vehicles or watercraft etc. An electric drive system of this kind, which may be designed as a purely electric or else as a hybrid-electric drive system, may have at least one electrical machine which is operated as an electric motor for driving the propulsion device or system of the aircraft. Furthermore, an appropriate source of electric energy for supplying the electric motor and, in some cases, a power electronics system, with the aid of which the electric motor is operated, are provided. In a hybrid-electric drive system, an internal combustion engine integrated into the drive system in series or in parallel and drives, for example, a generator which for its part provides electrical energy which may be stored in a battery and/or fed to the electric motor is further provided.

The demands placed on electrical machines of this kind are increasing continuously, very largely independently of the respective application. Owing to the constant optimization of electrical machines, in particular with regard to power density, the overall size and the space required for their components are reduced as far as possible. With a conventional single-tooth configuration of the stator of the machine, in which the stator windings may be configured as single-tooth windings, the individual windings have to be electrically connected to one another, for example, with the aid of correspondingly complex and expensive cable connections. For machines with a high number of pole pairs and therefore a high number of individual windings, this means, firstly, a high level of expenditure in terms of time in order to establish the connections and, secondly, that the resulting device is correspondingly complex and comparatively heavy. The time required to establish the connections is also further increased on account of soldering or laser welding processes that may be used for this purpose, these processes being correspondingly numerous and therefore time-consuming due to the number of contacts to be established.

The electrical interconnection of the individual tooth windings may therefore be implemented only with great effort and is furthermore susceptible to damage. It is therefore an object of the present disclosure to provide a possible way of improving the structure and the production of a winding system for a stator or a rotor of an electrical machine.

SUMMARY AND DESCRIPTION

This object is achieved with the aid of an interconnection unit, a method for producing a winding system, and a winding system as disclosed herein. The scope of the present disclosure is defined solely by the appended claims and is not affected to any degree by the statements within this summary. The present embodiments may obviate one or more of the drawbacks or limitations in the related art.

The interconnection unit, in particular which may be plugged in, is used to electrically connect at least a subset of winding arrangements of a winding system of a stator or a rotor of an electrical machine and has at least one connection arrangement for this purpose. This connection arrangement includes a large number of contact points which are configured and arranged on the interconnection unit in such a way that these contact points of the interconnection unit may be connected to corresponding contact points of the winding arrangements to be contact-connected. Furthermore, the connection arrangement has a large number of electrical connection sections, wherein a respective connection section connects two of the contact points to one another. This interconnection unit may be plugged onto the stator or onto the contact points of the winding arrangements of the stator, so that the connection arrangement effects prespecified interconnection of these winding arrangements without further effort, that is to say without soldering or welding processes etc. for example.

In this case, the interconnection unit may, depending on the design of the winding system, be configured for a single-phase or polyphase electric current to be applied and for this purpose have a number of connection arrangements corresponding to the number of phases of the current. In this case, such a connection arrangement may correspond to the "subset" introduced above. Each of the connection arrangements includes as components in each case a large number of the contact points and a large number of the electrical connection sections of the interconnection unit. The interconnection unit may therefore likewise be used in order to create a more complex winding system with a plurality of phases.

The components of a first of the connection arrangements and the components of a second of the connection arrangements may be electrically insulated from one another, so that the connection arrangements may carry the different phases independently of one another.

In each case, two contact points of a respective connection arrangement form a contact point pair of this connection arrangement. In this case, the contact points of a respective contact point pair are electrically insulated from one another. This insulation is removed only when a winding arrangement is connected to this contact point pair. That is to say, a contact point pair of a respective connection arrangement is configured so that a winding arrangement with its corresponding contact points may be arranged there. If so, the winding arrangement arranged there virtually connects the contact points of a respective contact point pair.

Furthermore, in each case, two contact point pairs of a connection arrangement are electrically contact-connected to one another by respective connection sections of this connection arrangement. That is to say, one of the contact points of a first contact point pair of one of the connection arrangements is electrically contact-connected by a respective connection section of this connection arrangement to one of the contact points of a second contact point pair of this connection arrangement, so that the contact point pairs of a respective connection arrangement are connected in series, that is to say form a series circuit. Consequently, the winding arrangements, which are arranged at these contact point pairs and connected by the interconnection unit, are therefore then also connected in series. In principle and depending on requirements, appropriate arrangement and contact-connection of the connection sections and contact points may result in contact point pairs of a respective connection arrangement being connected in parallel. Depending on requirements, the contact point pairs of a respective connection arrangement are therefore connected in series and/or in parallel.

Furthermore, each connection arrangement may have a pair of main electrical terminals. For a respective connection arrangement, in each case, one of the contact points of the first and one of the contact points of the last contact point pair of this connection arrangement is respectively connected via one of the connection sections of this connection arrangement to a main terminal of the pair of main electrical terminals of this connection arrangement. In conjunction with the series connection of the winding arrangements at the contact point pairs, this results in an electric current, which is fed to one of the main terminals of this connection arrangement, flowing in succession through the winding arrangements, which are arranged at the contact point pairs of this connection arrangement, in order to arrive at the second main terminal of this connection arrangement.

The interconnection unit may have a casing, wherein the connection sections run within the casing and the contact points are guided out of the casing, so that they may be contact-connected to the corresponding contact points of the winding arrangements. The provision of the casing results in improved electrical insulation and, in particular, protection of the connection sections from damage. Furthermore, it is possible to use the casing of the interconnection unit as an additional cooling surface or to integrate direct cooling into the casing of the interconnection unit.

The contact points may be configured as plug-in connectors, wherein the winding arrangements consequently have mating pieces for them which may be plugged onto the plug-in connectors. This results in an extremely simple way of assembling the winding system.

The casing, like the winding system, may be annular and may have a rectangular cross section as seen, for example, in the tangential viewing direction, so that simple handling results.

In the method for producing a winding system with a large number of winding arrangements to be contacted-connected to one another, in a first act, each of the large number of winding arrangements is arranged at its final position on an assembly of the electrical machine, (e.g., on the stator or on the stator ring or on the rotor), wherein contact points of the winding arrangements are not yet connected to one another. In a second act, the described interconnection unit is arranged on the assembly in such a way that its contact points enter into electrical contact with the contact points of the winding arrangements.

Before the second act, for at least a subset of the winding arrangements, an electrical interconnection of the winding arrangements of this subset is prespecified, in particular as a series and/or parallel connection. The interconnection unit is, in particular with respect to the positioning of the contact points and with respect to the selection of the contact points, which are connected to one another via the electrical connection sections, designed and accordingly produced such that the winding arrangements of the respective subset are interconnected as prespecified when the interconnection unit is arranged on the stator ring.

Such a subset may be one of the sub-winding systems already introduced above. That is to say, for example, in the event that the winding system is configured for a three-phase current, three subsets of this kind would be provided, and the interconnection unit would be configured such that the winding arrangements for each of these subsets are interconnected as prespecified when the interconnection unit is plugged on.

In the second act, the contact points of the interconnection unit are therefore plugged onto the contact points of the winding arrangements.

The correspondingly designed winding system accordingly has a large number of winding arrangements and the described interconnection unit, wherein the interconnection unit is configured and electrically contact-connected by way of its contact points to contact points of the winding arrangements in such a way that a prespecified series and/or parallel connection of at least one desired subset of the winding arrangements results.

The contact points of the winding arrangements and the contact points of the interconnection unit are matched to one another in such a way that they may be plugged onto one another, in particular in the manner of a plug/socket connection, for example, as so-called "male" and "female" contacts.

Each winding arrangement of the winding system may have a large number of individual windings which lie one behind the other in a current flow direction of the electric current flowing through the winding arrangement. The respective winding arrangement includes an uninterrupted electrical conductor shaped in such a way that it forms the plurality of individual windings of the respective winding arrangement. This particular design of the winding arrangements allows a less complex structure of the interconnection unit because consequently a smaller number of contact points of the winding arrangements have to be connected to one another.

Accordingly, the described interconnection unit represents an integrated component which, by way of its contact points, which may be configured as plug-in connectors, may be plugged onto the winding arrangements in a simple manner, so that the electrical connections between the winding arrangements may be established without any significant mechanical work.

In summary, the use of such an interconnection unit results in a large number of advantages. Firstly, no soldering or welding work is necessary in order to establish the interconnection, as a result of which the workload is considerably reduced. The risk of defects or damage occurring during production, which is considerable, for example, during welding work, is also significantly reduced because, among other things, no temperature is introduced. Secondly, a high degree of reproducibility, simple handling, and a reduction in the complexity of the interconnection may be achieved, for example, on account of the simplicity and the pluggability of the apparatus.

Owing to the use of pluggable connection elements of this kind, a very wide variety of plug-in systems may be implemented for different applications. For example, measurement and test components may be implemented with such a system. In the case of conventional connection technology, (e.g., welding or soldering), it is no longer possible to measure each individual component separately after the process has been completed because the individual components, (e.g., coils), are electrically connected to one another. When using a pluggable interconnection ring, measurements, and tests may be carried out on the individual coils at any time.

Further advantages and embodiments may be found in the drawings and the corresponding description.

BRIEF DESCRIPTION OF THE DRAWINGS

The disclosure and exemplary embodiments will be explained in more detail below with reference to drawings. There, the same components are identified by the same reference signs in various figures. It is therefore possible that, when a second figure is being described, no detailed explanation will be given of a specific reference sign that has already been explained in relation to another, first figure. In such a case, it may be assumed for the embodiment of the second figure that, even without detailed explanation in relation to the second figure, the component identified there by this reference sign has the same properties and functionalities as explained in relation to the first figure. Furthermore, for the sake of clarity, in some cases not all the reference signs are illustrated in all of the figures, but only those to which reference is made in the description of the respective figure.

In the drawings.

DETAILED DESCRIPTION

The terms such as "axial", "radial", "tangential", etc. relate to the axis used in the respective figure or in the example described in each case. In other words, the directions axially, radially, and tangentially relate to an axis of rotation of the rotor or to the corresponding axis of symmetry of the stator. Here, "axial" describes a direction parallel to the axis, "radial" describes a direction orthogonal to the axis, toward or away from the latter, and "tangential" is a direction which is directed in a circle around the axis at a constant radial distance from the axis and with a constant axial position. The expression "in the circumferential direction" is equivalent to "tangential".

Finally, in connection with components, (e.g., coils or stator teeth), the term "adjacent" is intended to express the fact that, in the case of "adjacent components", there is, in particular, no further such component between these two components but, for example, an empty intermediate space or possibly an object of a different kind.

For the sake of clarity, in some of the figures, in cases in which components are present in multiple instances, not all the components illustrated are provided with reference signs.

Figure 1:
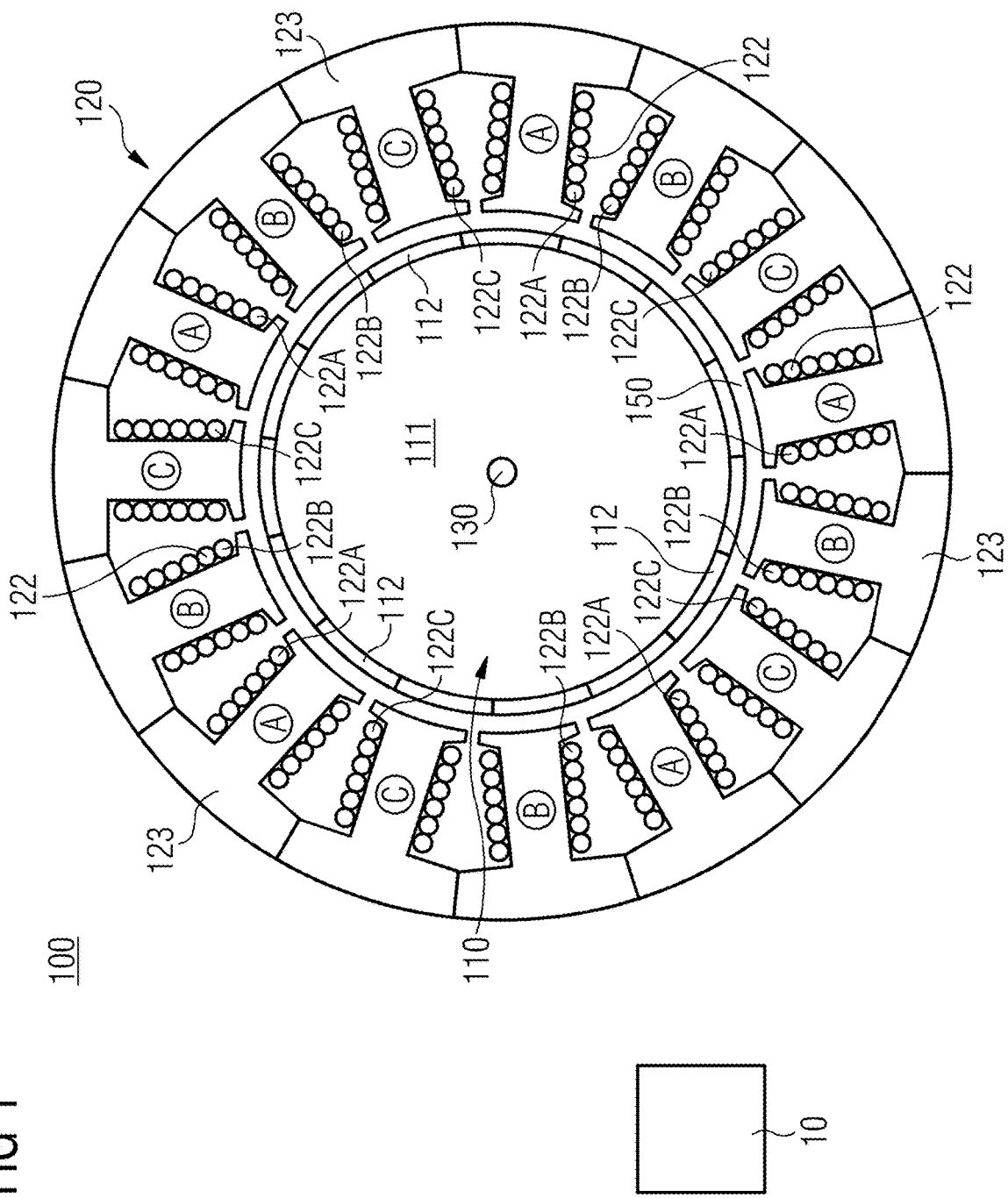
FIG. 1 depicts a known electrical machine.

FIG. 1 shows a highly simplified example of an electrical machine 100 which is configured as an electric motor, as is known in the prior art and as may be used, for example, for an electric drive system. The electric machine 100, in a similar structure, may also be operated as a generator in principle. Furthermore, the structure of the machine 100 described below is highly simplified and serves merely to illustrate the basic manner of operation of the electric motor or the electrical machine. It may be assumed to be known that the various components of the machine 100 may be arranged differently, depending on the specific desired design of the electric machine 100 as a generator or as an electric motor and/or as, for example, a radial-flow or axial-flow machine with a rotor configured as an internal or external rotor, etc. However, in the case under discussion here, the machine with a rotor configured as an internal rotor is of interest.

The electric motor 100 has a stator 120 with a stator winding system 121 and a substantially cylindrical rotor 110, configured here as an internal rotor, wherein the rotor 110 is arranged within the stator 120 and concentrically therewith and, in the operating state of the electric motor 100, rotates about an axis of rotation. The rotor 110 or its substantially cylindrical rotor main body 111 is connected in a rotationally fixed manner to a shaft 130, so that a rotation of the rotor 110 may be transmitted via the shaft 130 to a component, not illustrated, to be driven, for example, to a propeller of an airplane.

The stator 120 furthermore has a large number of stator teeth 123 and a first magnetic device or system 122, which are implemented as winding arrangements 122 of the stator winding system 121. In the example shown here, the winding arrangements 122 are configured as individual windings but may also include a large number of individual windings which are connected to one another in series. A respective individual winding is respectively positioned on one of the stator teeth 123 of the stator 120 and has an electric current flowing through it in the operating state of the electric motor 100, so that magnetic fields are generated. The rotor 110 has a second magnetic device or system 112 which are configured, for example, as permanent magnets 112 and may be arranged on a surface of the rotor main body 111 facing the stator 120. As an alternative, it is also conceivable, but not illustrated here, that the second magnetic device or system 112 is likewise configured as windings positioned on corresponding teeth of the rotor and then form a rotor winding system which basically functions like the stator winding system, that is to say currents flowing through the windings of the rotor winding system form magnetic fields. These interact, as indicated below, with the magnetic fields of the stator winding system.

The first and the second magnetic devices or systems 122, 112 are configured and arranged in a manner spaced apart from one another by an air gap 150 in such a way that the first and second magnetic devices or systems interact electromagnetically with one another in the operating state of the electric motor 100. This concept, including the conditions for the design and precise arrangement of the magnetic devices or systems 112, 122 or of the rotor 110 and stator 120, are known per se and therefore will not be explained in more detail below. In order to operate the electrical machine 100 as an electric motor, the stator winding system 121 or its winding arrangements 122 has/have electric currents applied to it/them with the aid of a power source 10, which may include a battery and a power electronic system (not shown), which electric currents cause the winding arrangements 122 to generate corresponding magnetic fields which interact electromagnetically with the magnetic fields of the permanent magnets 112 of the rotor 110. This results in a torque acting in a tangential direction or circumferential direction on the permanent magnets 112, which, provided that the permanent magnets 112 are connected sufficiently firmly to the rotor main body 111, results in the rotor 110 and conjointly therewith the shaft 130 being set in rotation when the components are suitably configured and arranged in relation to one another.

This concept of designing the electrical machine 100 as an electric motor may be assumed to be known. The alternative configuration and use of the electrical machine 100 as a generator may also be assumed to be known. A current/voltage signal supplied in a known manner by the generator 100 is fed to a load, for example, a battery, and processed accordingly there. On account of the familiarity of the concepts, the two designs of the electrical machine 100 are not detailed any further below.

The stator winding system 121 may be of polyphase design, for example, where n=3 phases A, B, C, wherein a plurality of winding arrangements 122 are assigned to each phase A, B, or C. The set of winding arrangements 122A, 122B, and 122C, respectively, assigned to a respective phase A, B, and C form a respective sub-winding system 121A, 121B, and 121C, respectively, of the stator winding system 121. In this case, the winding arrangements 122X, where X=A, B, C, of a respective sub-winding system 121X are connected in series, so that the electric current of the respective phase runs through the corresponding winding arrangements 122X one after the other. For this purpose, the winding arrangements 122X assigned to the respective phase X have to be correspondingly connected to one another. Each sub-winding system 121X may include a large number nX of winding arrangements 122Xi, where i=1, 2, 3, ..., nX.

Conventionally, electrically conductive intermediate pieces or bridges etc. are used to connect the individual winding arrangements 122 of a respective phase A, B, and C, respectively, to one another. However, the corresponding effort required to produce all the connections is enormous, because the stator winding system 121 may be configured in order for polyphase currents to be applied. The consequence of this design is that the intermediate pieces have to be used to connect winding arrangements 122 that are not spatially adjacent, but are spaced apart from one another, so that the required intermediate pieces overlap at a large number of points, this leading to an increase in complexity.

Figure 2:
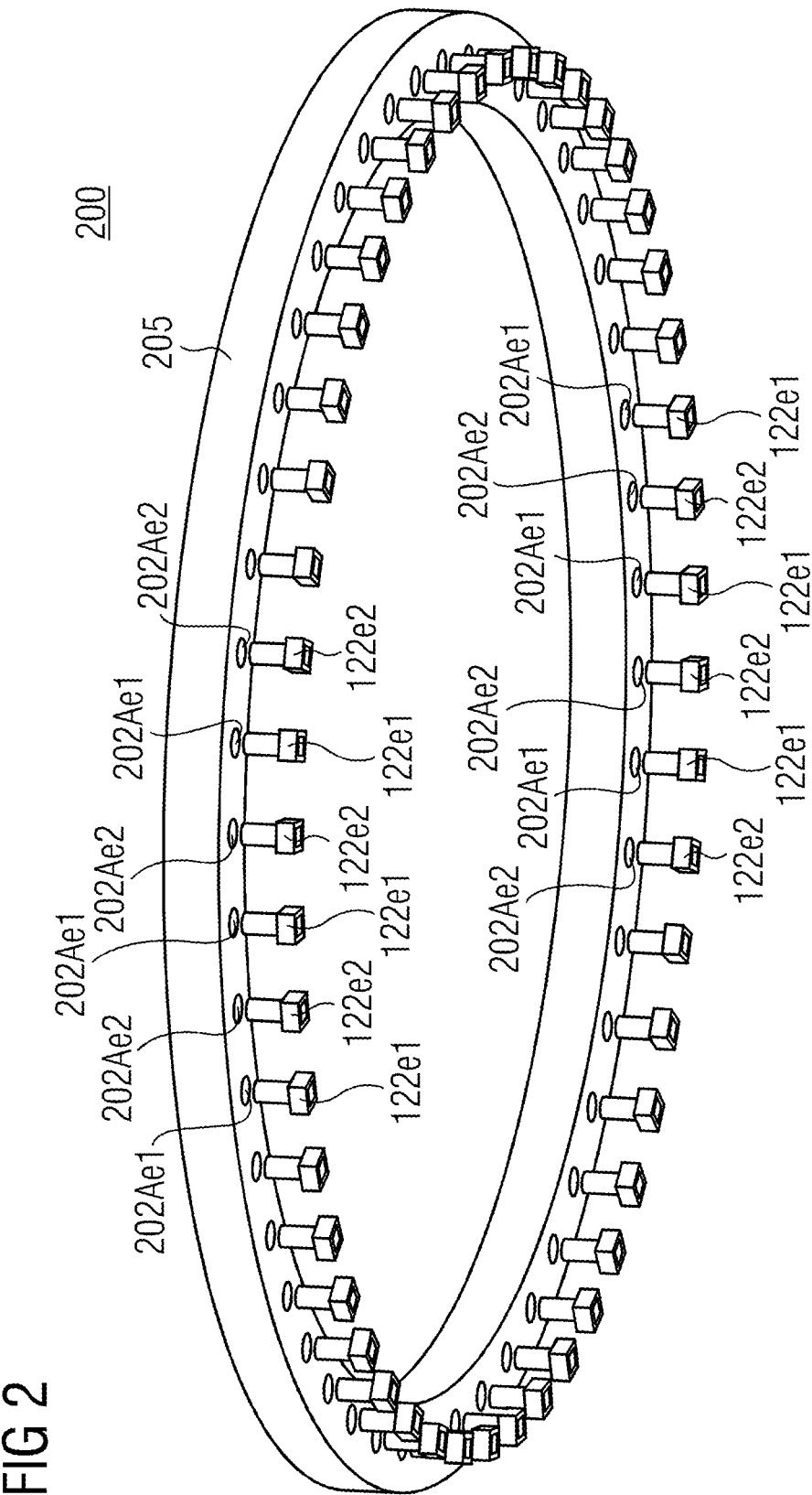
FIG. 2 depicts an example of an interconnection unit, illustrated in simplified form, for electrically contact-connecting windings of a stator winding system.

In order to improve this situation and in particular the production of such a stator winding system 121, the disclosure proposes the interconnection unit 200, shown in a highly simplified manner in FIG. 2, which, at suitable points, has electrical contact points 202 or below also 202Ae1, 202Ae2, (e.g., suitable plug-in connectors), which may be easily electrically connected to the corresponding terminals 122e1, 122e2 of the winding arrangements 122, if necessary with the aid of corresponding, optional adapter pieces 122ad and/or 202ad, which are illustrated in the more detailed FIG. 3. For the sake of clarity, FIG. 2 illustrates only the mentioned contact points 202Ae1, 202Ae2 of the interconnection unit 200 and the terminals 122e1, 122e2 of the winding arrangements, but not the winding arrangements themselves. Not all of these components are provided with reference signs here.

Figure 3:
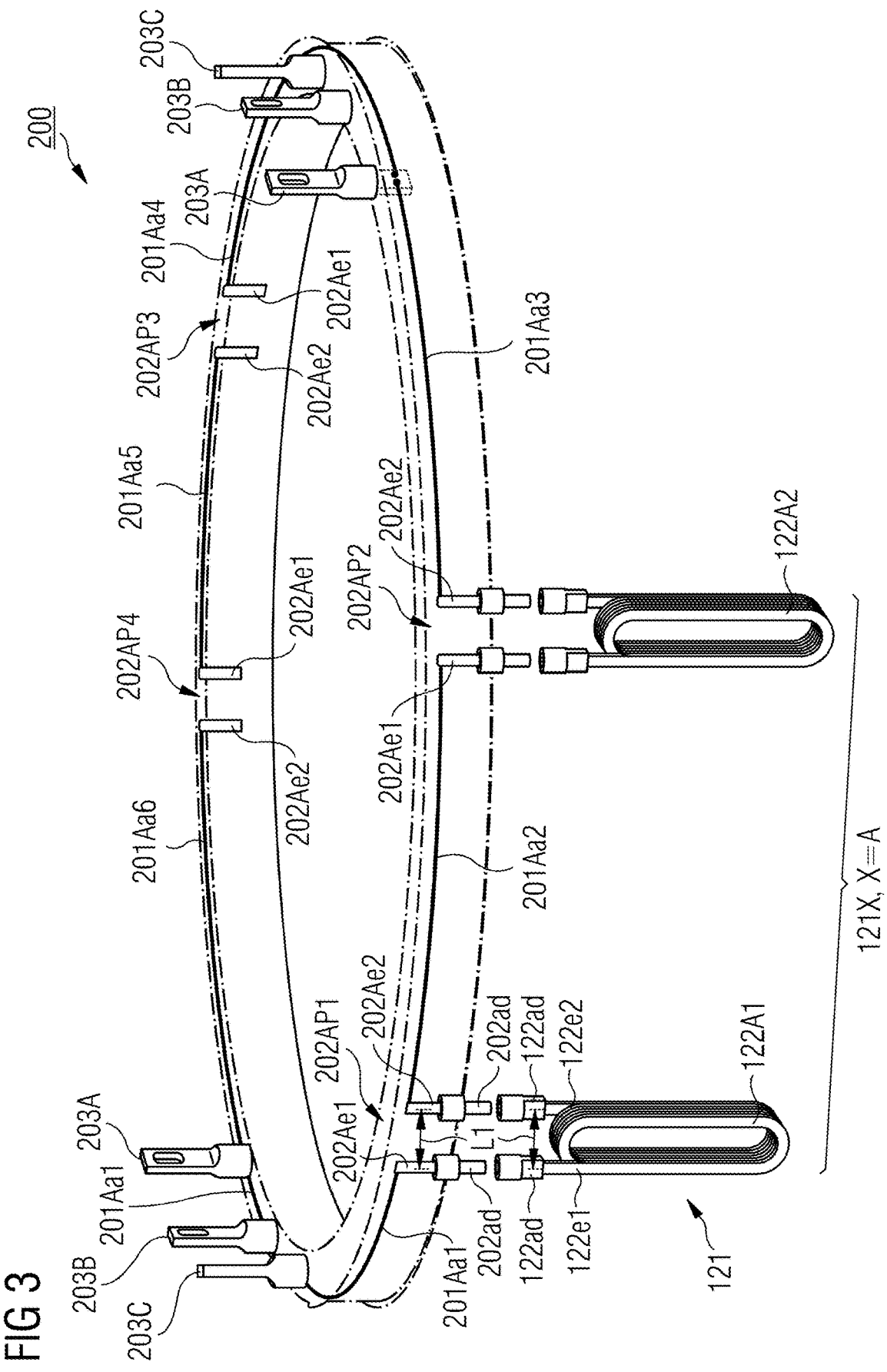
FIG. 3 depicts an example of a detailed illustration of the interconnection unit for electrically contact-connecting windings of a stator winding system.

FIG. 3 illustrates the interconnection unit 200 in a detailed manner, in particular with regard to the connection sections 201Xa, where X=A, B, C, running within the casing 205 of the interconnection unit 200. The interconnection unit 200 serves to interconnect the winding arrangements 122A, 122B, and 122C, respectively, in a simple manner to form a respective sub-winding system 121A, 121B, or 121C or, in particular, to connect them to one another in series. For this purpose, the interconnection unit 200 has, in or on a casing ring 205 of the interconnection unit 200, connection arrangements 201X with main terminals 203X for each phase X or for each sub-winding system 121X (here and below, for brevity and to improve readability, "X" is intended to stand for one of the phases A, B, or C, unless reference is made directly to a specific phase A, B, or C or a specific sub-winding system or a specific connection arrangement, for example in the description of the figures). The connection arrangements 201X furthermore each have connection sections 201Xa and electrical contact points 202Xe1, 202Xe2. In this case, in each case two contact points 202Xe1, 202Xe2 form a contact point pair 202XPi, where i=1, 2, 3, ..., nXP, wherein nXP indicates the number of contact point pairs 202XPi of the respective connection arrangement 201X. The contact points 202Xe1, 202Xe2 of a respective contact point pair 202XPi are not connected to one another without further provisions.

For the sake of clarity, FIG. 3 illustrates the connection sections 201Aa and contact points 202Ae1, 202Ae2 only for the connection arrangement 201A. The corresponding components of the connection arrangements 201B, 201C are arranged in an analogous manner in the ring 200, but not illustrated.

A connection section 201Xa of a respective connection arrangement 201X connects a first and a second contact point pair 202XP1, 202XP2 of this connection arrangement 201X to one another in such a way that each contact point 202Xe2 of a first 202XP1 of the two contact point pairs 202XP1, 202XP2 is electrically connected to a contact point 202Xe1 of the second contact point pair 202XP2 of the same connection arrangement 201X. Furthermore, in each case one of the main terminals 203X is also connected to a contact point 202Xe1 of a respective contact point pair 202XP via a connection section 201Xa.

The contact point pairs 202XP are provided and accordingly set up, for example as plug-in connectors, so that the corresponding contact points 202Xe1, 202Xe2 of the respective pair 202XP may be electrically connected to the terminals 122e1, 122e2 of a respective winding arrangement 122X, so that the winding arrangement 122X connected there ultimately electrically connects the contact points 202Xe1, 202Xe2 of this pair 202XP to one another. If a winding arrangement 122X is now arranged at each contact point pair 202XP of a phase X or to form a respective sub-winding system 121X, the resulting overall device including the interconnection unit 200 and the winding arrangements 122X arranged on it effects a series connection of the winding arrangements 122X between the main terminals 203X. A current may accordingly flow between the main terminals 203X via the connection sections 201Xa and the winding arrangements 122X connected between these connected winding arrangements 122X with the aid of the contact points 202Xe1, 202Xe2 of the contact point pairs 202XPi.

For the sake of clarity, details of the interconnection unit 200 are illustrated in FIG. 3 only for two winding arrangements 122A1, 122A2 of the first sub-winding system 121A. Each sub-winding system 121X may include a large number nX of winding arrangements 122Xi, where i=1, 2, 3, ..., nX, wherein, in some cases, nX=nXP. For the sake of clarity, in the further description of the interconnection unit 200, reference is likewise further made only to the first sub-winding system 121A and, accordingly, only the electrical connection arrangement 201A, provided for this sub-winding system 121A, of the interconnection unit 200 with its connection sections 201Aa and electrical contact points 202Ae1, 202Ae2 is described and identified in FIG. 3. Electrical connection arrangements 201B, 201C with their respective connection sections 201Ba, 201Ca and contact points 202Be1, 202Be2, 202Ce1, 202Ce2 for the remaining sub-winding systems 121B, 121C will not be explicitly discussed. However, as already mentioned, it may be assumed that these are constructed in the same way and operate like the corresponding components of the connection arrangement 201A for phase A which are assigned to the first sub-winding system 121A.

For example, an electric current fed in via the main terminal 203A will therefore initially reach a first contact point pair 202AP1 via a first connection section 201Aa1 of the connection arrangement 201A. The current flows, via the contact point 202Ae1 of the first contact point pair 202AP1, into and then through the first winding arrangement 122A1 of the sub-winding system 121A arranged there, in order to then enter the next connection section 201Aa2 via the second contact point 202Ae2 of the first contact point pair 202AP1. This carries the current to the next contact point pair 202AP2 and to the winding arrangement 122A2 etc. arranged there via the sections 201Aa3, 201Aa4, 201Aa5 and contact point pairs 202AP3, 202AP4.

The exact number and the design and arrangement of contact points 202Xe1, 202Xe2 and connection sections 201Xa of the interconnection unit 200 and how these are interconnected depends on the design of the stator winding system 121, that is to say, for example, on the number and positions of the winding arrangements 122X. The arrangement of FIG. 3 is therefore to be understood to be purely exemplary and non-limiting. The individual winding arrangements 122X are equipped at the two respective line ends 122e1, 122e2, for example, with plug-in connectors 122ad which may be plugged, without particular effort, onto the corresponding contact points 202Xe1, 202Xe2 or onto adapter pieces 202ad or the like that may be provided there. This has the effect that the stator 120 or, in particular, the stator winding system 121 may be installed very easily. In this case, the interconnection unit 200 is an integrated component, that is to say it includes, in addition to the main terminals 203X, in particular, the contact points or plug-in connectors 202Xe1, 202Xe2 and also the connection sections 201Xa connecting these, wherein all components 203X, 202Xe1, 202Xe2, 201Xa are arranged in or on the casing ring 205 of the interconnection unit 200.

In addition, the interconnection unit 200 is preconfigured for the stator winding system 121 to be constructed, that is to say the connection arrangements 201X are configured with regard to the winding arrangements 122X of the stator winding system 121, such that it is possible to plug the interconnection unit 200 onto the winding arrangements 122X easily and, in particular, without further adjustments with regard to the positioning, etc. of the contact points 202Xe1, 202Xe2. This includes, for example, the radial and tangential positions of the plug-in connectors 202Xe1, 202Xe2 corresponding to the radial and tangential positions of the terminals 122e1, 122e2 of the winding arrangements 122X when these are installed in the stator 120.

The casing ring 205 may be manufactured from a material which is electrically insulating and has good thermal conductivity for cooling purposes, (e.g., PEEK or a potting resin).

In order to produce the stator 120, the winding arrangements 122X are therefore, for example, first arranged in the final positions intended for them, so that the winding arrangements 122X may form a ring. In this case, the winding arrangements 122X may be configured in such a way that their terminals 122e1, 122e2 are oriented in a first axial direction when the winding arrangements 122X are arranged in these final positions. This is illustrated in a highly simplified manner and not true to scale in FIG. 4. The terminals 202Xe1, 202Xe2 of the interconnection unit 200, which may be annular and in accordance with the shape of the stator 120, are oriented in a second axial direction which, when the interconnection unit 120 is mounted on the stator 120, is opposite to the first axial direction. Owing to the identity of the radial and tangential positions of plug-in connectors 202Xe1, 202Xe2 and terminals 122e1, 122e2, of each which only one pair are provided with reference numerals for the sake of clarity, and due to the respective axial orientation of these components to be connected to one another, the interconnection unit 200, by way of its connections 202Xe1, 202Xe2, may be plugged onto the corresponding terminals 122e1, 122e2 in this axial direction for the purpose of completing the stator winding system 121.

Figure 4:
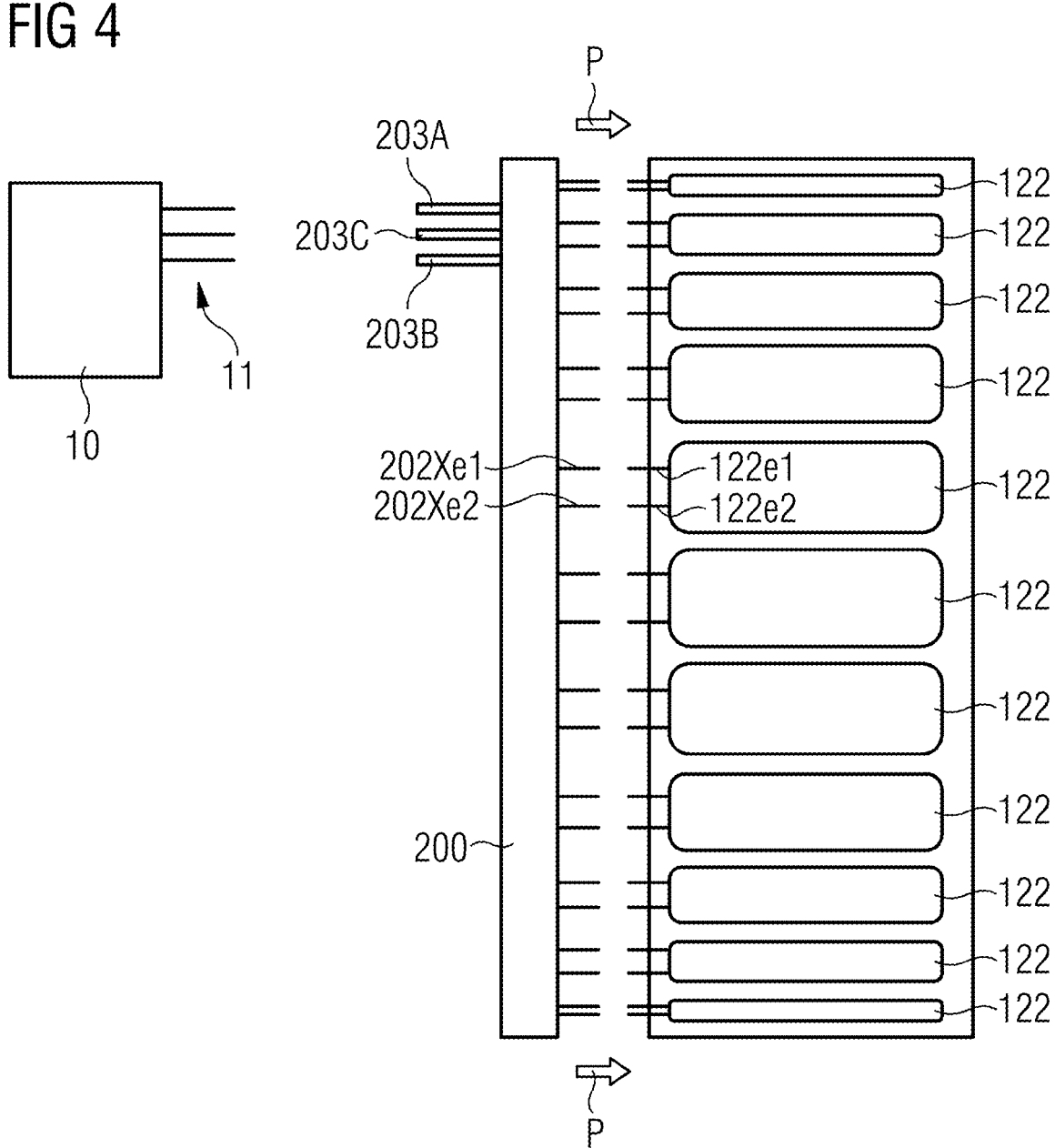
FIG. 4 depicts an example of a radial view of a stator winding system and an interconnection unit.

FIG. 4 shows the interconnection unit 200 and the stator 120 of the electrical machine 100 in a radial viewing direction and in a state in which these components 120, 200 are not yet assembled. The interconnection unit 200, which ultimately also still has to be connected to electrical terminals 11 of the power source 10, is, in the illustrated state, already positioned with respect to the stator 120 in such a way that the contact points 122e1, 122e2 of the stator 120 and 202Xe1, 202Xe2 of the interconnection unit 200 to be contact-connected to one another are opposite in the axial direction. The main terminals 203X may be arranged on the interconnection unit 200, as illustrated, in such a way that, when the interconnection unit 200 is plugged onto the stator winding system 121, they are oriented parallel to the first axial direction. As an alternative, they may also be oriented in the radial direction, in a manner directed radially inward or outward from the casing ring 205 depending on the available installation space. In the next act, for mounting the stator 120, the interconnection unit 200 would be pushed or plugged onto the stator 120 in the axial direction illustrated by the arrows "P", so that the desired interconnection of the winding arrangements 122 of the stator 120 is achieved. The final connection of the main terminals 203X of the interconnection unit 200 to electrical terminals 11 of the power source 10 may take place after the interconnection unit 200 has been mounted on the stator 120.

Mechanical work for connecting the components to one another, for example welding etc., may be avoided owing to the use of the plug-in connectors.

Figure 5:
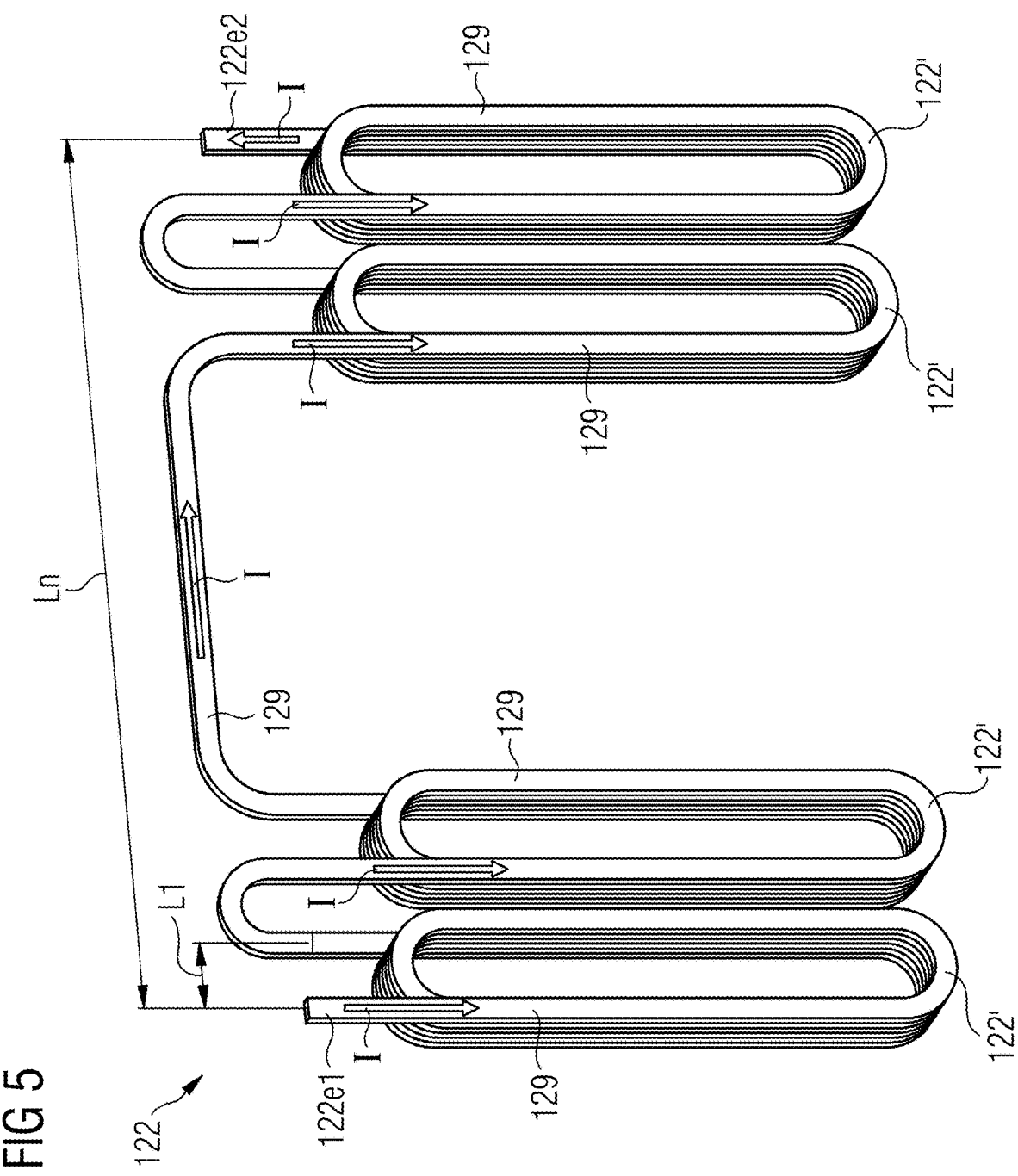
FIG. 5 depicts an example of a winding arrangement with a plurality of individual windings.

As an aspect of the abovementioned preconfiguration, the plug-in connectors 202Xe1, 202Xe2, onto which the terminals 122e1, 122e2 of the winding arrangements 122X are intended to be plugged, are at distances L1 from one another which each correspond to the distances L1 of the terminals 122e1, 122e2 of the respective winding arrangement 122X from one another. These distances L1 of the terminals 122e1, 122e2 depend on the design of the winding arrangement 122X. For the winding arrangements 122, it was previously assumed that, as illustrated in FIG. 3, they are each implemented only as individual windings. Ultimately, this means that a separate winding arrangement 122 with respective terminals 122e1, 122e2 and a contact point pair 202XP on the interconnection unit 200 have to be provided for each individual stator tooth 123. However, in a departure from this, it is conceivable and illustrated in FIG. 5 that a respective winding arrangement 122X or 122 includes a plurality of individual windings 122', for example four individual windings 122'. Stator teeth 123, on which the individual windings 122' are to be positioned, and the stator 120 itself are not illustrated in FIG. 5 for the sake of clarity.

The individual windings 122' of a respective winding arrangement 122X are connected one behind the other or in series, as seen in a current flow direction I, and therefore form a type of winding chain. This is achieved, for example, in that the individual windings 122' are formed from an uninterrupted electrical conductor 129 to form the winding arrangement 122. The feature that the conductor 129 is "uninterrupted" means, in particular, that the winding arrangement 122 formed in this way is not connected by separate intermediate pieces or the like connected between the individual windings 122', but rather is wound from a single piece of wire as it were. The result of this arrangement and interconnection is, in particular, that the distance Ln between the terminals 122e1, 122e2 of the winding arrangement 122 is significantly greater than the distance L1 between the terminals or the corresponding points of an individual winding 122'.

The use of winding chains 122 of this kind, which each include a number k>1 of individual windings 122', has the effect that, for a respective sub-winding system 121X, the total number of terminals 122e1, 122e2 of the winding arrangements 122X of this sub-winding system 121X is reduced by a factor which corresponds to the number of individual windings 122' per winding arrangement 122X of this sub-winding system 121X. Consequently, the interconnection unit 200 may therefore also be equipped with correspondingly fewer terminals 202Xe1, 202Xe2 or contact point pairs 202XP and connection sections 201Xa, so that the complexity of the interconnection unit 200 may be reduced. Although the interconnection unit 200 in itself already reduces the effort involved in producing the stator winding system 121 on account of the possibility of being simply plugged onto the winding arrangements 122X, on account of the large number of winding arrangements 122A, 122B, and 122C, respectively, to be connected, it is itself comparatively complex to construct because it has to have a structure of connecting arrangements 201X in or on the casing ring 205 that matches the large number of winding arrangements 122X. In addition, the electrical connection sections 201Xa running in the interconnection unit 200 have to be sufficiently well insulated from one another, this likewise making things more difficult with regard to the structure of the interconnection unit 200. The severity of these problems is improved when the winding arrangements 122X are configured as winding chains with a plurality of individual windings 122' per chain.

Although the disclosure has been described and illustrated more specifically in detail by the exemplary embodiments, the disclosure is not restricted by the disclosed examples and other variations may be derived therefrom by a person skilled in the art without departing from the scope of protection of the disclosure.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

LIST OF REFERENCE SIGNS

A, B, C, X Phase
10 Power source
11 Electrical terminals
100 Electrical machine
110 Rotor
111 Rotor main body
112 Magnetic device/system, permanent magnets
120 Stator
121 Stator winding system
121X Sub-winding system (X=A, B, C)
122 Magnetic device/system, winding arrangements
122' Individual winding
122ad Adapter pieces
122e1, 122e2 Electrical terminals
122X Winding arrangement (X=A, B, C)
123 Stator teeth
129 Uninterrupted electrical conductor
130 Shaft
150 Air gap
200 Interconnection unit
201X Connection arrangement (X=A, B, C)
201Xa Connection section (X=A, B, C)
202 Electrical contact points
202ad Adapter pieces
202Ae1, 202Ae2 Electrical contact points
202Xe1, 202Xe2 Electrical contact points (X=A, B, C)
202XPi Contact point pair
203X Main terminals (X=A, B, C)
205 Casing ring

The invention claimed is:

1. An interconnection unit for electrically connecting at least a subset of winding arrangements of a winding system of an electrical machine of an aircraft to one another, the interconnection unit comprising:
    at least one connection arrangement having:
        a plurality of contact points configured and arranged on the interconnection unit in such a way that the plurality of contact points of the interconnection unit is configured to be contact-connected to contact points of the subset of winding arrangements; and
        a plurality of electrical connection sections, wherein a respective electrical connection section electrically connects a first contact point of the plurality of contact points of the respective electrical connection section with a first winding arrangement of the subset of winding arrangements and connects a second contact point of the plurality of contact points of the respective electrical connection section with a second winding arrangement of the subset of winding arrangements,
    wherein each contact point of the plurality of contact points of the interconnection unit is configured to be plugged onto a respective contact point of a winding arrangement of the subset of winding arrangements.

2. The interconnection unit of claim 1, wherein the interconnection unit is configured for a single-phase or polyphase electric current to be applied,
    wherein the at least one connection arrangement comprises a plurality of connection arrangements corresponding to a number of phases of the single-phase or polyphase electric current, and
    wherein each connection arrangement of the plurality of connection arrangements in each case comprises a respective plurality of contact points, and a respective plurality of electrical connection sections of the interconnection unit as components.

3. The interconnection unit of claim 2, wherein the components of a first connection arrangement of the plurality of connection arrangements are electrically insulated from the components of a second connection arrangement of the plurality of connection arrangements.

4. The interconnection unit of claim 1, wherein in each case two contact points of the plurality of contact points of a respective connection arrangement of the at least one connection arrangement form a contact point pair, and
wherein the contact points of a respective contact point pair are electrically insulated from one another.

5. The interconnection unit of claim 4, wherein in each case one contact point of the contact points of a first contact point pair of a connection arrangement of the at least one connection arrangement is electrically contact-connected by a respective electrical connection section of the connection arrangement to one contact point of the contact points of a second contact point pair of the connection arrangement, so that the first contact point pair and the second contact point pair of a respective connection arrangement are connected in series and/or in parallel.

6. The interconnection unit of claim 5, wherein each connection arrangement of the at least one connection arrangement comprises a pair of main electrical terminals,
wherein, for a respective connection arrangement, in each case one contact point of the contact points of the first contact point pair and one contact point of the contact points of a last contact point pair of the connection arrangement is respectively connected via an electrical connection section of the plurality of electrical connection sections of the connection arrangement to a main terminal of the pair of main electrical terminals of the connection arrangement.

7. The interconnection unit of claim 1, further comprising:
a casing,
wherein the plurality of electrical connection sections runs within the casing and the contact points of the interconnection unit are guided out of the casing.

8. The interconnection unit of claim 7, wherein the contact points of the interconnection unit are configured as plug-in connectors.

9. The interconnection unit of claim 7, wherein the casing is annular and has a rectangular cross section as seen in a tangential viewing direction.

10. A method for producing a winding system of an assembly of an electrical machine with winding arrangements to be contacted-connected to one another, the method comprising:
arranging each winding arrangement of the winding arrangements at a final position on the assembly of the electrical machine, wherein contact points of the winding arrangements are not connected to one another;
arranging a plurality of contact points of at least one connection arrangement on an interconnection unit in such a way that the plurality of contact points of the interconnection unit enter into electrical contact and are contact-connected to the contact points of the winding arrangements; and
arranging a plurality of electrical connection sections of the at least one connection arrangement, wherein a respective electrical connection section electrically connects a first contact point of the plurality of contact points of the respective electrical connection section with a first winding arrangement of the winding arrangements and connects a second contact point of the plurality of contact points of the respective electrical connection section with a second winding arrangement of the winding arrangements,
wherein each contact point of the plurality of contact points of the interconnection unit is configured to be plugged onto a respective contact point of a winding arrangement of the winding arrangements.

11. The method of claim 10, further comprising, before the arranging of the interconnection unit on the assembly:
prespecifying an electrical interconnection of the winding arrangements for at least a subset of the winding arrangements; and
producing the interconnection unit such that the winding arrangements of the respective subset are interconnected as prespecified when the interconnection unit is arranged on the assembly.

12. The method of claim 11, wherein the producing of the interconnection unit is with respect to the positioning of the contact points of the interconnection unit and with respect to a selection of the contact points of the interconnection unit, which are connected to one another via the electrical connection sections.

13. A winding system comprising:
a plurality of winding arrangements; and
an interconnection unit comprising at least one connection arrangement having:
a plurality of contact points configured and arranged on the interconnection unit in such a way that the plurality of contact points of the interconnection unit is configured to be contact-connected to contact points of the winding arrangements; and
a plurality of electrical connection sections, wherein a respective electrical connection section electrically connects a first contact point of the plurality of contact points of the respective electrical connection section with a first winding arrangement of the winding arrangements and connects a second contact point of the plurality of contact points of the respective electrical connection section with a second winding arrangement of the winding arrangements,
wherein each contact point of the plurality of contact points of the interconnection unit is configured to be plugged onto a respective contact point of a winding arrangement of the winding arrangements, and
wherein the interconnection unit is configured and electrically contact-connected by way of the contact points of the interconnection unit to contact points of the winding arrangements in such a way that a prespecified series and/or parallel connection of at least one prespecified subset of the winding arrangements results.

14. The winding system of claim 13, wherein the contact points of the winding arrangements and the contact points of the interconnection unit are configured to be plugged into one another via a plug/socket connection.

15. The winding system of claim 13, wherein each winding arrangement comprises individual windings which lie one behind the other in a current flow direction of an electric current flowing through the respective winding arrangement, and
wherein the respective winding arrangement comprises an uninterrupted electrical conductor shaped in such a way that the uninterrupted electrical conductor forms the individual windings of the respective winding arrangement.

16. The winding system of claim 13, wherein each contact point of the plurality of contact points of the interconnection unit is configured to be plugged onto the respective contact point of the winding arrangement of the winding arrangements without further adjustment to a positioning of the plurality of contact points of the interconnection unit.

17. The interconnection unit of claim 1, wherein each contact point of the plurality of contact points of the interconnection unit is configured to be plugged onto the respective contact point of the winding arrangement of the subset of winding arrangements without further adjustment to a positioning of the plurality of contact points of the interconnection unit.

\* \* \* \* \*